United States Patent [19]

Matsumoto et al.

[11] Patent Number: 5,034,168
[45] Date of Patent: Jul. 23, 1991

[54] METHOD OF CONTROLLING THE RESTARTING OF INJECTION MOLDING MACHINES

[75] Inventors: Tetsunori Matsumoto, Shizuoka; Katsuhiro Inaba, Numazu; Tsutomu Hosoya, Susono, all of Japan

[73] Assignee: Toshiba Kikai Kabushiki Kaisha, Tokyo, Japan

[21] Appl. No.: 600,022

[22] Filed: Oct. 18, 1990

[30] Foreign Application Priority Data

Oct. 18, 1989 [JP] Japan .................................. 1-271088

[51] Int. Cl.$^5$ .............................................. B29C 45/76
[52] U.S. Cl. .................................. 264/39; 264/40.1; 264/328.1; 425/136; 425/170
[58] Field of Search ................... 264/39, 40.1, 40.6, 264/328.1; 425/135, 136, 145, 155, 166, 170

[56] References Cited

U.S. PATENT DOCUMENTS 4,421,467 12/1983 Richmond ........................... 425/170
4,808,355 2/1989 Kamiyama et al. .................. 264/39
4,826,418 5/1989 Kamiguchi ........................... 425/136

Primary Examiner—Jill L. Heitbrink
Attorney, Agent, or Firm—Koda and Androlia

[57] ABSTRACT

A method of controlling an injection molding machine wherein a purging operation for changing a raw material resin, a warming up operation for warming up the machine until a condition at which a mass producing operation can be started are preset, and metal mold temperatures corresponding to successive operations and metal mold temperatures corresponding to successive purging and warming up operations are preset so as to successively perform the purging and warming up operations and then begin the mass producing operation, characterized in that at the time of restarting the injection molding machine, after removal a trouble which caused a temporal pause of the operation of the machine, a pause time and the metal mold temperature are detected from the warming up operation corresponding to the set mold temperature, the restarting being commenced in accordance with the set metal mold temperatures which vary depending upon a length of the pause time.

1 Claim, 2 Drawing Sheets

METHOD OF CONTROLLING THE RESTARTING OF INJECTION MOLDING MACHINES

BACKGROUND OF THE INVENTION

This invention relates to a method of controlling an injection molding machine.

When the operation of an injection molding machine is stopped by some cause or trouble, the trouble is repaired and then the operation of the injection molding machine is resumed. According to a prior method, at the time of restarting the machine, several times of trial operations were performed so as to judge whether the molded products are good or bad. When the result of judgment is good a mass producing operation is started.

Further, in an injection molding machine capable of starting the mass producing operation by sequentially switching a plurality of predetermined starting up or warming up conditions. The judgment as to whether the operation can be changed to the mass producing operation or not is effected based on which one of the warming up conditions was made by the operator of the machine.

More particularly, as the mass producing was performed in accordance with the experience and the degree of skill of an operator, where the operator has a less experience, there are such defects that efficient utilization of raw material resin can not be done and that the operating time becomes too long.

SUMMARY OF THE INVENTION

Accordingly, it is an object of this invention to provide novel method of automatically controlling an injection molding machine, wherein at the time of restarting the injection molding machine, the purging operation or the warming up operation is started depending upon the cooling state of a metal mold or the length of the operation pause period are then transferred to the mass producing operation.

According to this invention there is provided a method of controlling an injection molding machine wherein a purging operation for changing a raw material resin, and a warming up operation during which trial operations are performed until a mass producing operation can be started are preset with successive number of operations, and metal mold temperatures corresponding to successive purging and warming up operations are preset so as to successively perform the judging and warming up operations, and then begin the mass producing operation, the improvement wherein at the time of restarting the injection molding machine after removing the trouble which caused a temporal pause of the operation of the injection molding machine, a pause time and the metal mold temperatures are detected from the warming up operation corresponding to the set metal mold temperature, the restarting being commenced in accordance with the set metal mold temperatures which vary depending upon a length of the pause time.

DESCRIPTION OF THE PREFERRED EMBODIMENT

Figure 1:
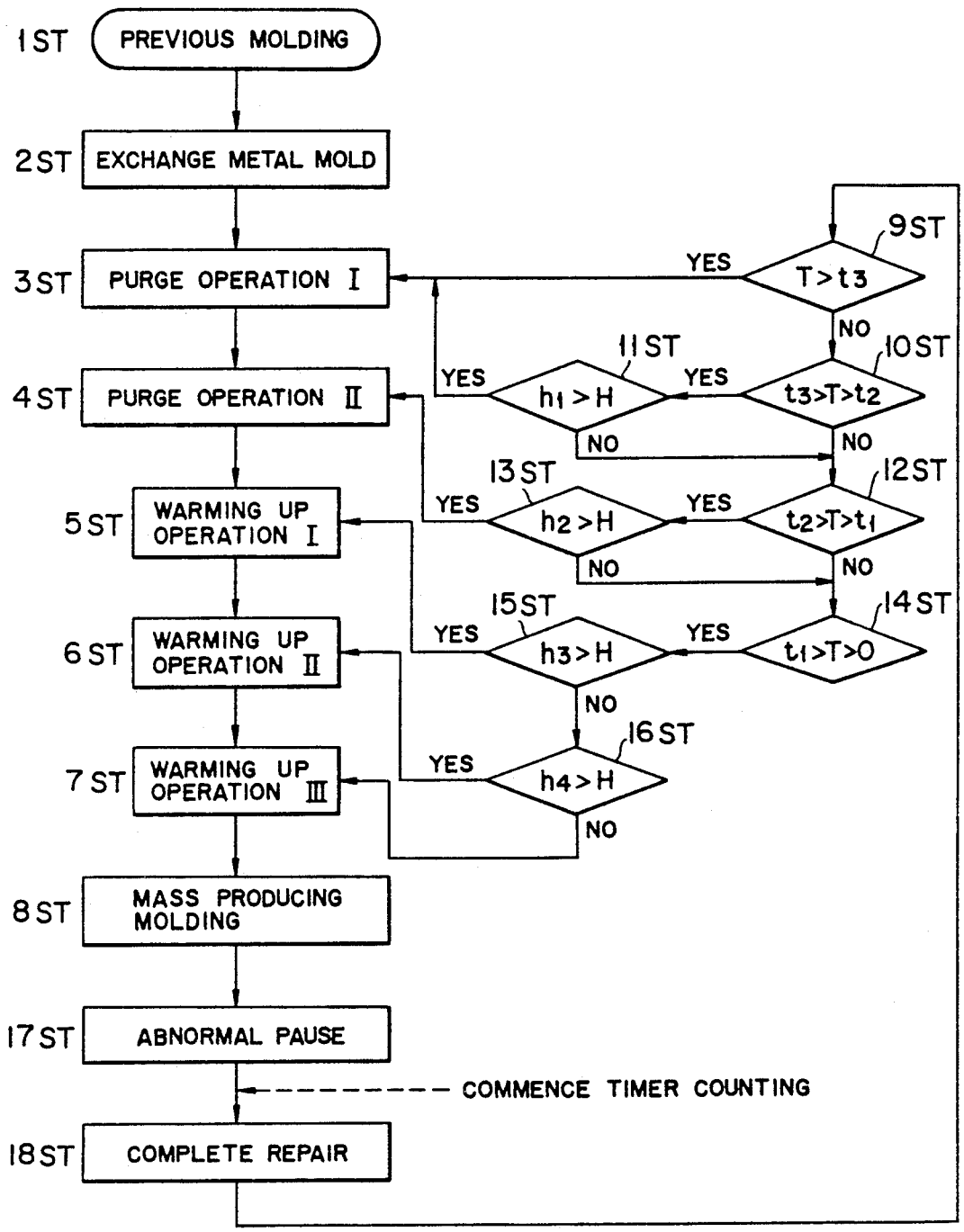
FIG. 1 is a flow chart showing one embodiment of this invention.

A preferred embodiment of this invention will now be described with reference to the flow chart shown in FIG. 1 in which the method of controlling comprises the steps of metal mold exchanging, purgings I, and II, warming ups I, II and III and mass producing.

In the above description, the term purging I means a step of rotating a screw at a limit position of the screw advancement, for example for purging old (not injected) resin remaining in a heating cylinder, whereas the term purging II means a step of repeatedly metering and injecting a resin subsequent to the purging step I. The term warming up I means a preparation step to be performed before the mass producing injection molding and subsequent to the purgings. In this step, the metal mold temperature is set to a temperature to a value a little lower than that used for mass producing molding. Under this condition, a low temperature trial molding is effected for several shots so as to make uniform the temperature of the entire portions of the metal mold, thereby performing a preparation operation before transferring to the mass producing molding. In the warming up step III, if the metal mold temperature increases beyond a temperature suitable for mass production, the mold temperature would be lowered to a proper value.

Although in the foregoing description each of the purging and warming up operations was constituted by three steps, it should be understood that the number of steps is not limited to three. For example, such factors as the injection speed and the injection stroke can be added to the metal mold temperature for the warming up operation.

Figure 2:
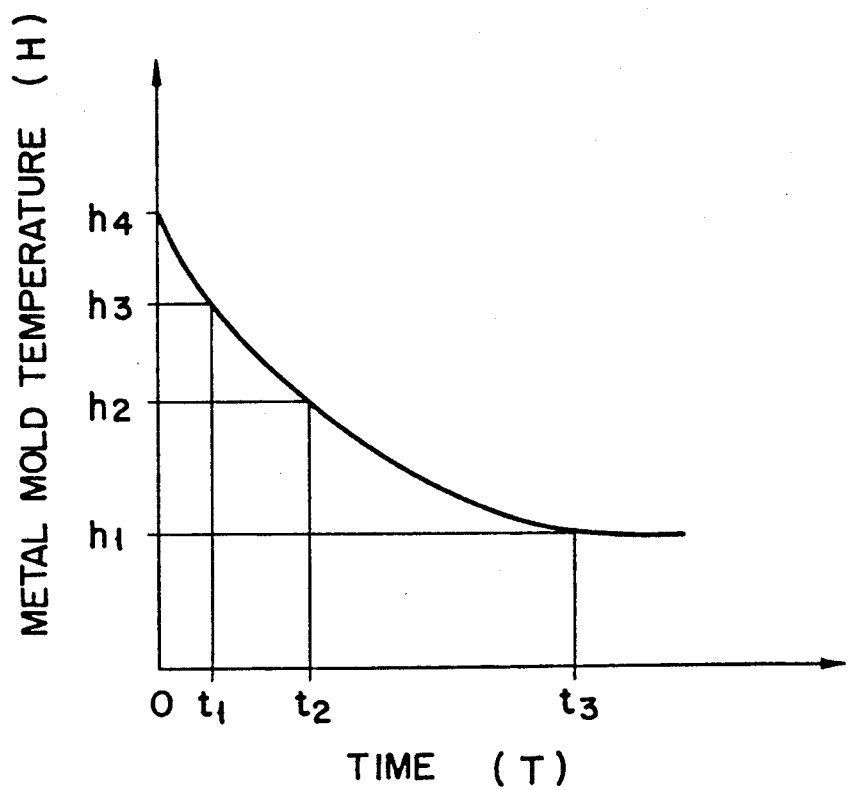
FIG. 2 is a graph showing the relationship between the machine pause period and the metal mold temperature, the graph being useful to understand the flow chart shown in FIG. 1.

Denoting the relation among the metal mold temperatures at purging operations I and II and warming up operations I and II by $h_1 < h_2 < h_3 < h_4$, denoting by $t_1$ the interval in which the mold temperature decreases from $h_4$ to $h_3$, denoting by $t_2$ the interval in which the mold temperature decreases from $h_3$ to $h_2$ and denoting by $t_3$ the interval in which the metal mold temperature decreases from $h_2$ to $h_1$, the relation between the metal mold temperature H and the pause time T can be shown by a graph shown in FIG. 2.

At step 1ST where an injection molding machine which has been operated for mass production is stopped by an abnormal condition, a timer, not shown, starts a counting operation and the temperature H of the metal mold gradually decreases from $h_4$ adequate for mass production. When the cause of stop or pause is understood and repair is finished at step 2ST the metal mold is exchanged and when the metal mold temperature becomes H at any one of steps 3ST~8ST, initiation of the operation is started.

More particularly, after completion of repair, at step 9ST a judgment is made as to whether the pause time T is larger than the pause time $t_3$ until a point is reached at which the mold temperature H decreases to temperature $h_1$ at the time of purging operation I. When the result of judgment at step 9ST is YES, the program is returned to step 3ST and the restarting of the operation is started from purging I. When the result of $h_2$ judgment is NO, that is when the pause time T is shorter than $t_3$, the program is transferred to step 10ST at which a judgment $t_3 > T > t_2$ is made. When the result is YES, the program is transferred to step 12ST for judging a relation $t_2 > T > t_1$. When the result of judgment is YES, the program is transferred to step 13ST for judging a relation $h_2 > H$, that is for judging as to whether the metal mold temperature H is lower than the metal mold temperature $h_2$ at the time of the purging operation II. When the result of judgment at step 13ST is YES, that is metal mold temperature H is lower than $h_2$, the program is transferred to step 4ST for performing purging II thereby restarting the operation of the machine. When the result of judgment at step 13ST is NO, that is when the metal mold temperature H is higher than temperature $h_2$, and when the result of judgment of step 12ST is NO, the program is transferred to step 14ST at which a judgment is made as to whether the pause time T is shorter than time $t_1$. When the result of judgment at step 14ST is YES, the program is transferred to step 15ST, at which a judgment is made as to whether the metal mold temperature H is lower than the metal mold temperature $h_2$ at the time of the warming up operation I. When the result of judgment at step 15ST is YES, that is when the metal mold temperature H is lower than temperature $h_3$ restarting of the machine is started from the warming up operation I, whereas when the result of judgment is NO, that is when the metal mold temperature H is higher than the temperature $h_3$, the program is transferred to step 16ST at which a judgment is made as to whether the metal mold temperature H is lower than the metal mold temperature $h_4$ at the time of the warming up operation II. When the result of judgment at step 16ST is YES, that is when the metal mold temperature H is lower than the temperature $h_4$, the program is transferred to step 6ST for effecting the warming up operation II followed by the normal operation, whereas when the metal mold temperature H is higher than the temperature $h_4$, that is when the result of judgment at step 16ST is NO, the program is transferred to step 7ST at which after performing the warming up operation III, the normal operation of the injection molding is resumed at step 8ST.

As above described after the warming up operation III at step 7ST, the process is transferred to the mass producing operation effected at step 8ST. During a mass producing operation, when the machine stops by a trouble at step 17ST, an inspection and repair are made. At step 17ST a time counting is commenced. When the repair is completed at step 18ST, the mass producing operation is resumed.

As above described according to the control method of this invention, when an injection molding machine which sequentially performs purging, warming up and mass producing operations stops its operation during the mass producing operation by a certain cause or trouble, at the time of starting the normal operation after removing the trouble, since the metal mold temperatures for purging, warming up and mass producing operations are predetermined, a judgment can be made from which process step the machine can be restarted so that the control can be made automatically by measuring the metal mold temperature which varies in accordance with the starting time. As a result, even a not skilled operator can prevent use of surplus quantity of the raw material and excessive operating time.

What is claimed is:

1. In a method of controlling an injection molding machine wherein a purging operation for changing a raw material resin, a warming up operation during which trial operations are performed until a mass producing operation can be started are preset with successive number of operations, and metal mold temperature corresponding to successive purging and warming up operations are preset so as to successively perform the purging and warming up operations, and then begin the mass producing operation, the improvement wherein at the time of restarting the injection molding machine, after removing a trouble which caused a temporal pause of the operation of the injection molding machine, a pause time and the metal mold temperatures are detected from said warming up operation corresponding to said set metal mold temperatures, said restarting being commenced in accordance with said set metal mold temperatures which vary depending upon a length of the pause time.

* * * * *